Sept. 17, 1968  H. S. SPACIL  3,402,078
SOLID STABILIZED ZIRCONIA OR THORIA HAVING A LAYER OF
TANTALUM PENTOXIDE AND TITANIUM OXIDE THEREON
Filed April 29, 1964

Inventor:
Henry S. Spacil,
by Paul R. Webb, II
His Attorney.

ends of the leads are connected to apparatus (not shown) being operated by the cell. Means are provided for supplying a gaseous oxidant containing molecular oxygen to porous layer 12 which oxidant includes, for example, air or oxygen. For example, a tube 23 connected to an oxidant supply (not shown) supplies oxidant to porous layer 12.

I discovered unexpectedly that a composite article which is usable as an electrode-electrolyte body could be constructed to provide both the cathode and the electrolyte for a high temperature fuel cell operable in the range of 1000° C. to 1200° C. I found that such a composite article is formed from a solid oxygen-ion member with a porous layer of doped tantalum pentoxide on one surface thereof. I found also that the solid oxygen-ion member could be used in the form of a hollow tubular member, a flat plate, or a container. In each of these forms, the solid oxygen-ion material has an adherent porous layer of doped tantalum pentoxide on one surface thereof. The composite body provides an electrode-electrolyte body for a fuel cell wherein both the cathode and the solid electrolyte are contained in a unitary structure.

I found that the preferred oxygen-ion material is solid stabilized zirconia. However, other solid oxygen-ion material such as solid doped thoria is satisfactory. Solid stabilized zirconia, which is a solid oxygen-ion electrolyte material, is a compound with a cubic crystal structure consisting of zirconia to which is added calcium oxide, yttrium oxide, or a mixture of rare earth oxides. For example, a preferred solid zirconia member is employed which is stabilized with 11 molecular percent calcium oxide. Other stabilized zirconia, which may also be employed as the solid stabilized zirconia member, are discussed in "Oxide Ceramics" by Ryshkewitch, Academic Press, 1960, particularly on pages 354, 364 and 376 thereof.

Solid doped thoria is also a solid oxygen-ion electrolyte material which consists of thoria to which is added calcium oxide, yttrium oxide, or a mixture of rare earth oxides. For example, a solid doped thoria consists of thoria which is doped with the addition of a four molecular percent calcium oxide to increase its conductivity.

I found that doped tantalum pentoxide is an electronic semiconductor which is a very satisfactory cathode material in a porous layer adhering to one surface of a solid oxygen-ion electrolyte. Doped tantalum pentoxide as is employed in this application defines tantalum pentoxide to which has been added titanium as the doping agent. Further, the term, "doped," includes doping or adding titanium in a substantial amount. For example, a preferred doped tantalum pentoxide is tantalum pentoxide to which has been added ten molecular percent of titanium in the total titanium-tantalum metal content. A composite article of this electrolyte and this cathode provides a desirable electrode-electrolyte body.

In the preparation of the composite article shown in FIGURES 1, 2 and 3 in the drawing, the solid oxygen-ion member of stabilized zirconia is prepared from zirconia powder to which has been added 11 molecular percent calcium oxide. The material is formed into a hollow tubular member, a container or a flat plate shown in FIGURES 1, 2 and 3, respectively. If desired the solid stabilized zirconia can be purchased commercially.

A preferred method of forming a porous layer of doped tantalum pentoxide on the solid zirconia member to provide a composite article therefrom is to initially mix titanium oxide, $TiO_2$, and tantalum pentoxide, $Ta_2O_5$ in proportions to give ten molecular percent titanium in the total titanium-tantalum metal content. The titanium oxide and tantalum pentoxide are ground in a suitable material such as ethanol. The resulting mixture is then dried and calcined in air at 1500° C. for 30 minutes. The resulting oxide is then crushed, ground, passed through a 325 mesh screen, and made into a slurry with an aqueous solution of a water soluble binder employing a material such as Carbowax 6000 which is a non-volatile, solid polyethylene glycol having a freezing range of 58°–62° C. and a flash point >475° F.

The slurry is then painted onto the outer surface of a solid stabilized zirconia member such as the hollow tubular member shown in FIGURE 1 of the drawing. An assembly of the solid stabilized zirconia tubular member with the slurry painted thereon is then dried by infrared heating to remove moisture. The assembly is then fired in air at 1550° for thirty minutes. A porous layer of doped tantalum pentoxide forms adherently to the outer surface of the solid stabilized zirconia member to provide a composite article. This porous layer of doped tantalum pentoxide does not degrade the zirconia member. The same method may be employed with the zirconia members in FIGURES 2 and 3 of the drawing. Either the interior or exterior surface of the container in FIGURE 2 or the plate in FIGURE 3 is provided with a porous layer of doped tantalum pentoxide.

In FIGURE 4 of the drawing, a hollow tubular member 11 of solid stabilized zirconia with a porous layer 12 of doped tantalum pentoxide thereon as shown in FIGURE 1 of the drawing as composite article 10 is prepared as a composite article in accordance with the above method. The composite article which is a unitary electrode-electrolyte body is combined with other elements to form a fuel cell 17. An inlet line 18 is provided to communicate with the chamber formed by the solid stabilized zirconia member 11 and to supply a hydrocarbon gas, such as methane or propane to the cell wherein the gas is thermally decomposed to carbonaceous material which is supplied to the interior surface of member 11 as at 19 to provide an anode for the fuel cell. An outlet line 20 is provided at the opposite end of member 11 and removes the carbon monoxide which forms during operation of the cell. Thus, the carbonaceous material provides both the carbonaceous fuel and the anode for the cell. A lead 21 of platinum is attached to the doped tantalum pentoxide electrode 12 while a lead 22 of nickel contacts anode 19 by being positioned adjacent member 11. The free ends of the leads are connected to apparatus (not shown) being operated by the cell. Means are provided for supplying a gaseous oxidant containing molecular oxygen in the form of air or oxygen to doped tantalum pentoxide electrode 12. For example a tube 23 connected to an oxidant supply (not shown) supplies oxidant to electrode 12.

In the operation of fuel cell 17 shown in FIGURE 4, heat, such as waste heat, is supplied from a source (not shown) to raise the temperature of electrolyte 11, cathode 12 and anode 19, which anode is provided from a hydrocarbon gas or from a carbon vapor through inlet line 17, to a temperature in the range of 1000° C. to 1200° C. The porous doped tantalum pentoxide cathode is then saturated with oxygen which is supplied through tube 23 to the cathode. The reaction at the cathode-electrolyte interface is as follows:

(1) 

The oxygen ion moves through electrolyte 11 to combine with carbon in accordance with the following reaction at the anode-electrolyte interface:

(2) 

The electrons, which are given up at anode 19 are conducted through lead 22 to apparatus (not shown) being operated while the oxygen at cathode 12 combines with returning electrons. The carbon monoxide which is generated at anode 19 is released to the atmosphere, used to provide further heat for the cell, or fed to a fuel cell employing carbon monoxide as a fuel. Such release is through outlet line 20.

Composite articles which are unitary electrode-electrolyte bodies were made in accordance with the present

# United States Patent Office 3,402,078
Patented Sept. 17, 1968

3,402,078
SOLID STABILIZED ZIRCONIA OR THORIA HAVING A LAYER OF TANTALUM PENTOXIDE AND TITANIUM OXIDE THEREON
Henry S. Spacil, Schenectady, N.Y., assignor to General Electric Company, a corporation of New York
Filed Apr. 29, 1964, Ser. No. 363,548
2 Claims. (Cl. 136—86)

ABSTRACT OF THE DISCLOSURE

An integrated body is prepared by applying an adherent porous layer of doped tantalum pentoxide over a major surface of a substrate of solid oxygen-ion material. Preparation of the doped tantalum pentoxide and application thereof to the substrate is described. The principal application for such a body is in high temperature fuel cell construction and a fuel cell structure employing stabilized zirconia as the substrate electrolyte is described.

---

This invention relates to composite articles and more particularly to composite articles having a solid oxygen-ion member, and an adherent porous layer of doped tantalum pentoxide thereon, which composite articles are useful as electrode-electrolyte bodies in high temperature fuel cells.

Solid stabilized zirconia electrolyte fuel cells, which operate in the temperature range of 1000° C. to 1200° C., are described and claimed in copending applications Ser. No. 92,354, filed Feb. 28, 1961, now U.S. Patent No. 3,138,487, and Ser. No. 312,710, filed Sept. 30, 1963, now U.S. Patent No. 3,138,490. Such high temperature fuel cells are advantageous to provide a low voltage direct current power source on a continuous basis. These cells have application in various chemical process industries, such as the manufacture of aluminum and electro-refining of copper. The operation of direct current motors could also be accomplished with these cells.

In the "Journal of the Electrochemical Society," volume 104, June 1957, on pages 379–387, there is an article entitled, Measurements of Galvanic Cells Involving Solid Electrolytes, by Kalevi Kiukkola and Carl Wagner. This article describes electromotive force measurements on galvanic cells involving solid electrolytes such as zirconia stabilized with calcium oxide and employing electrodes comprising a mixture of a metal and a metallic oxide. In these types of cells, the metal-metallic oxide electrode requires both metal and the metallic oxide, which metallic oxide is not doped. The metal must be present in the electrode to provide electronic conductivity.

In U.S. Patent 2,914,596 issued on Nov. 24, 1959 in the name of E. Gorin et al. and titled, "Shaped Porous Semi-Conducting Compositions of Lithiated Nickel Oxide," there is described an electrode of porous lithiated nickel oxide and the employment of such an electrode in a fuel cell employing a molten carbonate electrolyte.

In copending application Ser. No. 363,549, Tragert, filed April 29, 1964, there is disclosed and claimed a composite article comprising a solid oxygen-ion member, and an adherent porous layer of lithiated nickel oxide on one surface of the number. This copending application is assigned to the same assignee as the present application. The present application is directed to a unitary solid structure incorporating a solid oxygen-ion electrolyte and a doped tantalum pentoxide cathode.

It is an object of my invention to provide a composite article.

It is another object of my invention to provide a composite article having a solid oxygen-ion member, and an adherent porous layer of doped tantalum pentoxide on one surface of the member.

It is another object of my invention to provide a composite article forming a unitary solid electrode-electrolye body usable in a fuel cell operable at temperatures in the range of 1000° C. to 1200° C.

It is a further object of my invention to provide in a fuel cell including an anode, the combination of an electrode-electrolyte body, and means for supplying a gaseous oxidant containing molecular oxygen to the surface of the body.

In carrying out my invention in one form, a composite article comprises a solid oxygen-ion member, and an adherent porous layer of doped tantalum pentoxide on one surface of the member.

These and various other objects, features, and advantages of the invention will be better understood from the following description taken in connection with the accompanying drawing in which.

Figure 1:
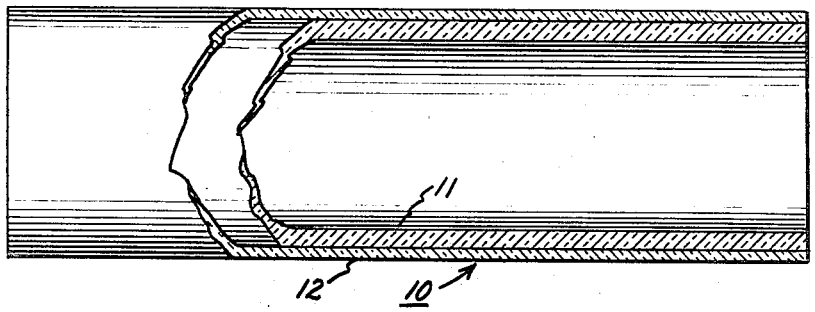
FIGURE 1 is a sectional view of a composite article embodying my invention.

In FIGURE 1 of the drawing, a composite article is shown generally at 10 which comprises a member 11 of solid oxygen-ion material, and an adherent porous layer 12 of doped tantalum pentoxide on the exterior surface of member 11. For example, member 11 is composed of solid stabilized zirconia and is in the form of a hollow tubular member.

Figure 2:
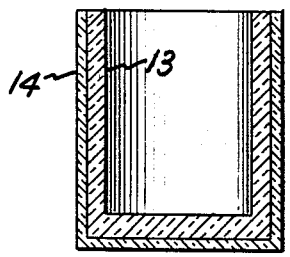
FIGURE 2 is a sectional view of a modified composite article.

In FIGURE 2 of the drawing, there is shown a modified composite article comprising a container 13 consisting of solid oxygen-ion material, and an adherent porous layer 14 of doped tantalum pentoxide on the exterior surface of container 13.

Figure 3:
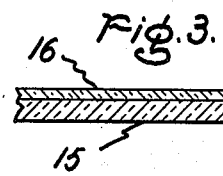
FIGURE 3 is a sectional view of another modified composite article.

In FIGURE 3 of the drawing, there is shown another modified composite article comprising a plate 15 of solid oxygen-ion material, and an adherent porous layer 16 of doped tantalum pentoxide on one surface of plate 15. In FIGURES 2 and 3, both the container and plate are composed of solid stabilized zirconia.

Figure 4:
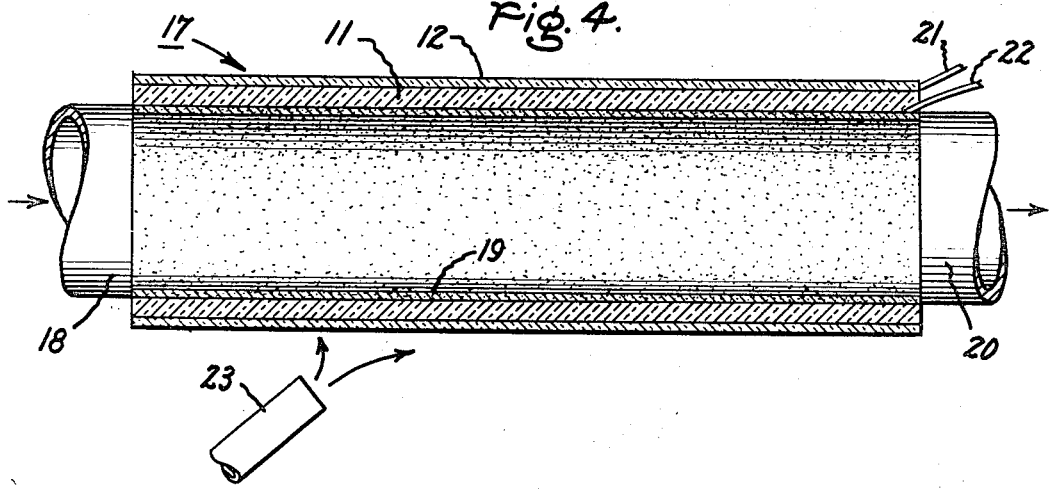
FIGURE 4 is a sectional view of a high temperature fuel cell embodying the composite article of my invention.

In FIGURE 4 of the drawing, there is shown a high temperature fuel cell 17 embodying composite article 10 of FIGURE 1 which comprises a hollow tubular member 11 of solid stabilized zirconia, and a porous layer 12 of doped tantalum pentoxide on the exterior surface of member 11. Member 11 of composite article 10 is the solid electrolyte of fuel cell 17 while porous layer 12 of article 10 is the cathode for fuel cell 17. The anode for the fuel cell and the fuel is derived from carbonaceous material which is supplied to the interior surface of member 11. For example, an inlet line 18 provides a hydrocarbon gas, such as methane or propane to fuel cell 17 wherein the gas is thermally decomposed to carbonaceous material which is supplied to the interior surface of member 11 as at 19 to provide an anode. An outlet line 20 removes the carbon monoxide which forms during the operation of fuel cell 17. Thus, the carbonaceous material provides both carbonaceous fuel and anode 19 for cell 17.

Electrodes 12 and 19 are reversible with porous layer 12 of doped tantalum pentoxide on the interior surface of member 11 and carbonaceous anode 19 in direct contact with the exterior surface of member 11. A lead 21 of platinum is attached to porous layer 12 of doped tantalum pentoxide which is the cathode while a lead 22 of nickel contacts anode 19 by being positioned adjacent tubular member 11 which is the electrolyte. The free invention. These electrode-electrolyte bodies were composite articles each of which comprised a solid stabilized zirconia member with an adherent porous layer of doped tantalum pentoxide thereon. The porous layer of doped tantalum pentoxide was prepared in accordance with the method set forth above.

Two fuel cells are assembled in accordance with FIGURE 4 of the drawing. Each fuel cell has a composite article comprising a solid stabilized zirconia member with an adherent porous layer of doped tantalum pentoxide thereon, a carbon anode decomposed from a hydrocarbon gas, an oxidant containing molecular oxygen, and a hydrocarbon fuel of methane. Each cell is heated to its operating temperature in a resistance furnace. Electrical leads are connected to both electrodes and the power generated by the cell is dissipated in a simple decade resistor. The first fuel cell is heated to a temperature of 1000° C. and remains at this temperature for a period of two hours. A load voltage of 0.5 volt and a current density of 12 milliamperes per square centimeter are exhibited. The second fuel cell is heated to a temperature of 1100° C. for a period of two hours. A load voltage of 0.5 volt and a current density of 20 milliamperes per square centimeter is exhibited.

While other modifications of this invention and variations thereof which may be employed within the scope of the invention have not been described, the invention is intended to include such as may be embraced within the following claims.

What I claim as new and desire to secure by Letters Patent of the United States is:

1. A composite article comprising a solid stabilized zirconia member, and an adherent porous layer consisting essentially of tantalum pentoxide and up to about 10 molecular percent of titanium oxide dopant on one surface of said member.

2. A composite article comprising a solid doped thoria member, and an adherent porous layer consisting essentially of tantalum pentoxide and up to about 10 molecular percent of titanium oxide dopant on one surface of said member.

References Cited

UNITED STATES PATENTS

| | | | |
|---|---|---|---|
| 2,417,461 | 3/1947 | Becker | 117—221 X |
| 2,962,452 | 11/1960 | Counts et al. | 252—520 |
| 3,033,907 | 5/1962 | Rue | 252—62.3 |
| 3,138,487 | 6/1964 | Tragert | 136—86 X |
| 3,146,131 | 8/1964 | Linden et al. | 136—86 |
| 3,257,239 | 6/1966 | Shultz et al. | 136—86 |
| 3,281,273 | 10/1966 | Oser | 136—86 |

OTHER REFERENCES

Hausner, H. H. "Semiconducting Ceramic Materials," in J. Am. Ceramic Soc., vol. 30, No. 9, 1947. (Only pages 290, 291, 292 relied upon).

ASTIA, AD 286686 "Third Status Report on Fuel Cells" June 1, 1962 U.S. Army Signal Research and Development Laboratory, Fort Monmouth, N.J. (Only page 71 relied upon.)

ALLEN B. CURTIS, *Primary Examiner.*